United States Patent
Kim et al.

(10) Patent No.: US 6,711,288 B2
(45) Date of Patent: Mar. 23, 2004

(54) METHOD FOR DESIGNATING LOCAL REPRESENTATIVE COLOR VALUE AND AUTO-DETERMINING DETECTION ALGORITHM ON COLOR IMAGE

(75) Inventors: Hyeon Jun Kim, Kyungki-do (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/196,143

(22) Filed: Jul. 17, 2002

(65) Prior Publication Data

US 2002/0181768 A1 Dec. 5, 2002

Related U.S. Application Data

(62) Division of application No. 09/239,527, filed on Jan. 29, 1999, now Pat. No. 6,445,818.

(30) Foreign Application Priority Data

May 28, 1998 (KR) ............................................. 98/19402
Jul. 4, 1998 (KR) ............................................. 98/26958

(51) Int. Cl.[7] ................................................. G06K 9/00
(52) U.S. Cl. ...................................... 382/165; 382/170
(58) Field of Search ................................. 382/162, 165, 382/168, 170, 224, 228

(56) References Cited

U.S. PATENT DOCUMENTS

| | | | |
|---|---|---|---|
| 5,150,433 A | * 9/1992 | Daly | 382/250 |
| 5,751,286 A | 5/1998 | Barber et al. | 345/348 |
| 5,793,888 A | 8/1998 | Delanoy | 382/219 |
| 5,806,061 A | 9/1998 | Chaudhuri et al. | 707/3 |
| 5,818,970 A | * 10/1998 | Ishikawa et al. | 382/248 |
| 5,915,250 A | 6/1999 | Jain et al. | 707/100 |
| 6,195,497 B1 | 2/2001 | Nagasaka et al. | 386/46 |

OTHER PUBLICATIONS

Foley, J.D. et al. "Fundamentals of Interactive Computer Graphics" 1982, pp. 613–616.
Bach, Jeffrey R. et al. "The Virage Image Search Engine: An open framework for image management", Virage, Inc., San Diego, Ca.
Smith, John R., "Integrated Spatial and Feature Image Systems: Retrieval, Analysis and Compression", Columbia University, 1997.

* cited by examiner

Primary Examiner—Timothy M. Johnson
(74) Attorney, Agent, or Firm—Fleshner & Kim, LLP

(57) ABSTRACT

A method for designating a local representative color value and automatically determining image searching algorithm for a color based image searching system is disclosed. A method for designating a local representative color values generally includes the steps of dividing a color image area; and obtaining a color histogram for each block, obtaining a color group from hue histograms of each block, or obtaining a maximum color group value to designate the representative color value. Also, a method determining a search algorithm generally includes the steps of detecting the number of color blocks CB having color information from the blocked information of a reference image; comparing the number of the color blocks with a determined reference value and assigning different weights to at least two search algorithm according to the comparison results; and performing a comparison search of an image by the search algorithm based on the determined weight.

20 Claims, 8 Drawing Sheets

METHOD FOR DESIGNATING LOCAL REPRESENTATIVE COLOR VALUE AND AUTO-DETERMINING DETECTION ALGORITHM ON COLOR IMAGE

This application is a Divisional of application Ser. No. 09/239,527 filed Jan. 29, 1999 now U.S. Pat. No. 6,445,818.

BACKGROUND OF THE INVENTION

1. Field of the Invention

The present invention relates to a color image processing method, and more particularly to a method for designating a local representative color value and automatically determining an optimal image searching algorithm on a color image.

2. Discussion of Related Art

In the field of color image analysis and processing, extensive researches for a method to accurately search images are actively being conducted. In response, commercial image searching apparatus and/or applications program are being developed to meet the demand for an improved image searching.

An image searching system based on content of the image is generally divided into a feature extraction module extracting characteristics of the images, an image searching module searching the images, and a module of image database.

To expedite the searching process, the characteristics of images are extracted as the images are input to the image database and the extracted characteristics are also stored in the image database. Subsequently, if a user requires an image search, a similarity between respective images are determined utilizing the characteristic information of a reference image and target images stored in the database. The target images are sorted according to the result of the comparison.

The most important information for use in the content based image searching is the color information. Accordingly, an effective performance of an image searching apparatus or applications program depends greatly on an accurate method for extracting the color information.

Generally, the number of different colors which can theoretically be expressed by a computer has been steadily increasing. However, the number of colors which can be displayed by the computer is limited by the available number of quantized colors.

In computers, a color is expressed utilizing the RGB color model based upon the three primary colors of red R, green G, and blue B. However, the RGB space is hardware oriented and a limitation exists in expressing the color changes such that the change can be visually sensed by the human eye. Thus, the hue, chroma, and brightness of the RGB space is often converted into a user oriented HSV color model based upon a hue H, saturation S and value V, then converted back to the RGB space by quantization. The CIE standards may be utilized to convert from the RGB space to the HSV color space.

Numerous amount of content based image searching apparatuses or applications programs utilizing the HSV space have been already proposed in the related art.

The characteristic information used for image searching are extracted from every pixel of an image and are mapped to color indexes. The weight of each color index on the image may be represented by a color histogram. Thus, the color histogram is an important data, indicating a color distribution of the image. Generally, there are two types of color histograms represented by n number of quantized colors, namely a global color histogram and a local color histogram.

In the local color histogram, an image is divided into n number of grids and a local histogram for each grid cell is determined. A representative index color of each local histogram is defined as a local representative color of the corresponding grid.

Thus, the global color histogram indicates a color distribution in an overall image and represents the total distribution of colors for respective pixels of the overall image, and the local color histogram indicates a distribution in a local grids and represents the total distribution of the color on a specific region of the image.

To build a color histogram, the RGB values in each pixel of an input image is converted a user oriented color space, and the converted RGB values are mapped to one of n number of colors according to its quantized color area. Based upon the mapped color, the global color histogram and the local color histogram are constructed for all image pixels. Subsequently, the histograms of a reference image and target images are compared, and arranged in the order of highest similarity. Such order becomes a sequential array of most similar images by the color information.

In the content based image searching system, accurate color values of the image must be obtained to perform an effective analysis.

FIGS. 1A through 1E show an example method for designating a local representative color value on a color image. FIG. 1A shows an image to be analyzed, FIG. 1B indicates a color histogram for an overall image, FIG. 1C shows the image by block or grid state, FIG. 1D sets forth a local histogram for each grid; and FIG. 1E shows the designated local representative color value for each grid.

Particularly, the color characteristic of the image is represented by the global color histogram as shown in FIG. 1B. The image has also been partitioned into block areas with constant sizes for a local consideration of the image. Accordingly, the color characteristic of each block areas is represented by the local color histogram as shown in FIG. 1D.

If only the global color histogram as shown in FIG. 1B is utilized in the image search, local contents of the image would not be considered. However, if the local color histogram as shown in FIG. 1D is also utilized to take into consideration the local contents, a memory with a large storage capacity would be required for storing each local color histogram data. Also, it would be difficult to easily represent the color characteristic of the image.

Numerous search algorithms according to the image characteristics have been conventionally utilized in the content base image searching system. The search algorithm for the image searching system is typically based upon a local representative color, a major color region (MCR), and a global color histogram.

The local representative color indicates a representative color value for each grid of a divided image. If there is no color representable in a grid, a "Don't Care" symbol would be represented. The major color region indicates a position on which a major color of the image is represented. For example, the major color grid may be represented as a minimum square grid. The major color here means a color which has been distributed more than a specific threshold.

As discussed above, in the content base image searching system of the related art, numerous algorithm may be used in considering several different search characteristics. Moreover, in searching images, a user manually controls the weight of the algorithm through a user interface. However, it is very difficult for a user to directly control the image searching algorithm during an image search.

Especially, there may be a significant differences in visual angle or sensual level of a person resulting in different contents stored in the database. Furthermore, for a user who is not a highly trained expert group, manually controlling the weight of numerous search algorithm is very difficult.

Finally, the differences in the visual angle or sensual level of persons makes it difficult to determine the weight of the optimum search algorithm while maintaining a high speed image searching system.

SUMMARY OF THE INVENTION

Accordingly, an object of the present invention is to solve at least the problems and disadvantages of the related art.

An object of the present invention is to provide a method for designating a local representative color value on a color image.

Another object of the present invention is to provide a method for an automatic selection of the most proper search algorithm in an image searching system.

Still another object of the present invention is to provide a method for an automatic selection of a search algorithm in a content base image searching system utilizing a characteristic weight.

Additional object of the present invention is to provide a method for auto-determining the detection algorithm in an image detector capable of furnishing linearly the weight according to the number of color blocks of the local grid.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for designating a local representative color value on a color image includes the steps of: dividing a color image area into blocks of a constant size; building color histograms for each blocks and comparing the maximum value of the histogram with a first reference value; designating the maximum value as a representative color value for its block if the maximum value is more than the first reference value; obtaining color groups from the color histograms of respective blocks and comparing the gained values to a second reference value if the maximum value is less than the first reference value; and designating a maximum color group value as a representative color value of its block if the maximum color group value is more than the second reference value; and if the maximum color group value is less than the second reference value, attaining a distribution rate of the color group from the color histogram of each block, distributing and adjusting a mean or an appropriate weight of values more than a given threshold in the distribution rate, from the attained values, and designating the value as the representative color value of the corresponding block.

A method for automatically determining the searching algorithm selector in an image searching system comprises the steps of: searching the number of color blocks CB having color information of the blocks in a reference image; comparing the number of the color blocks with a determined reference value and determining weights to be assigned to at least two search algorithms; and performing a comparison search of an image by the search algorithm based on the determined weight.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 2A:
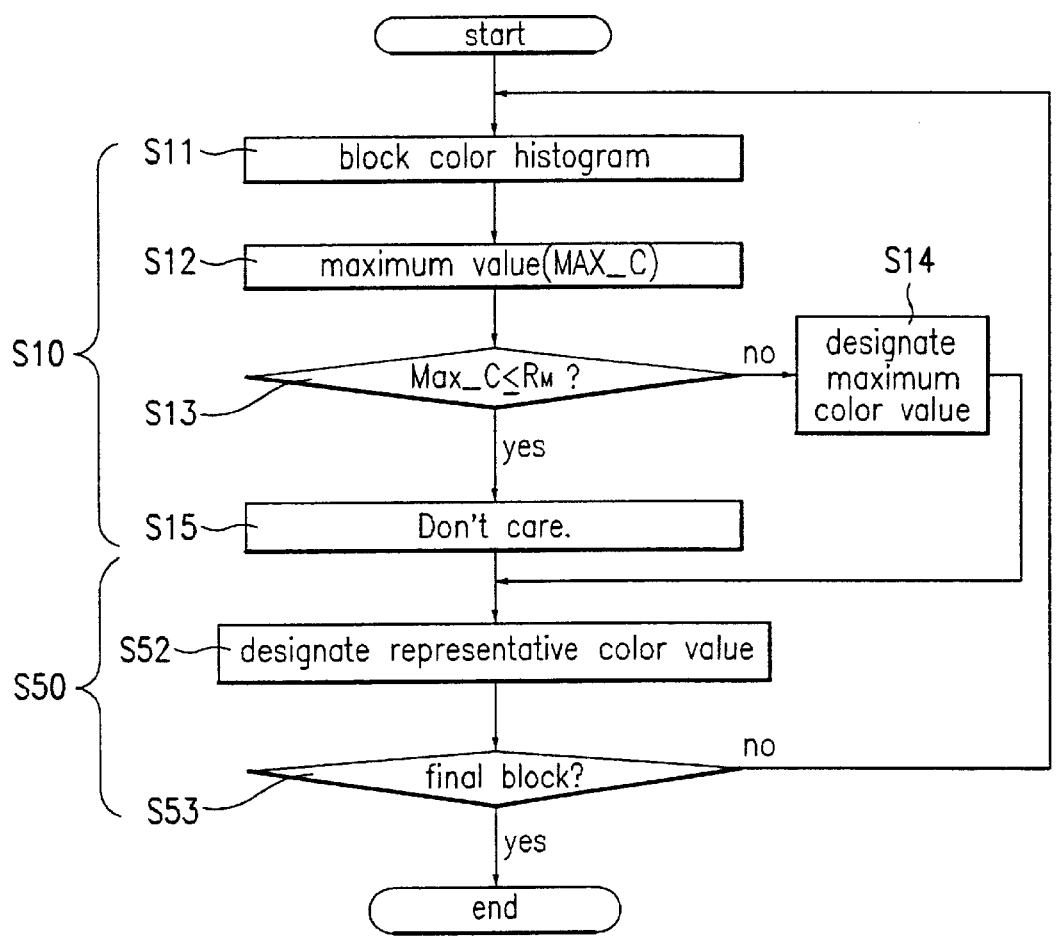
FIGS. 2A–2C are flow charts illustrating methods for designating local representative color values on a color image according to the present invention.
Figure 2B:
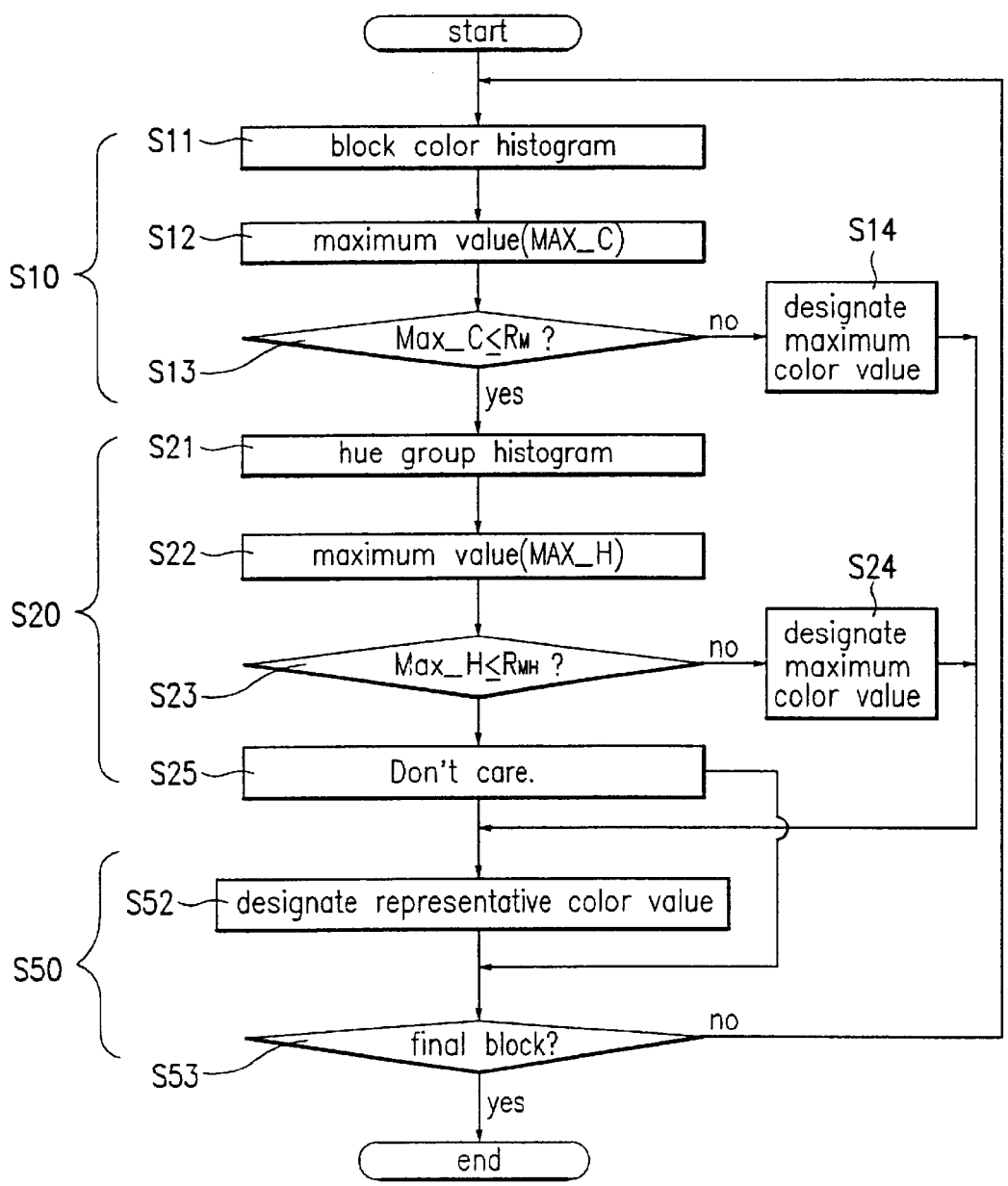
Figure 2C:
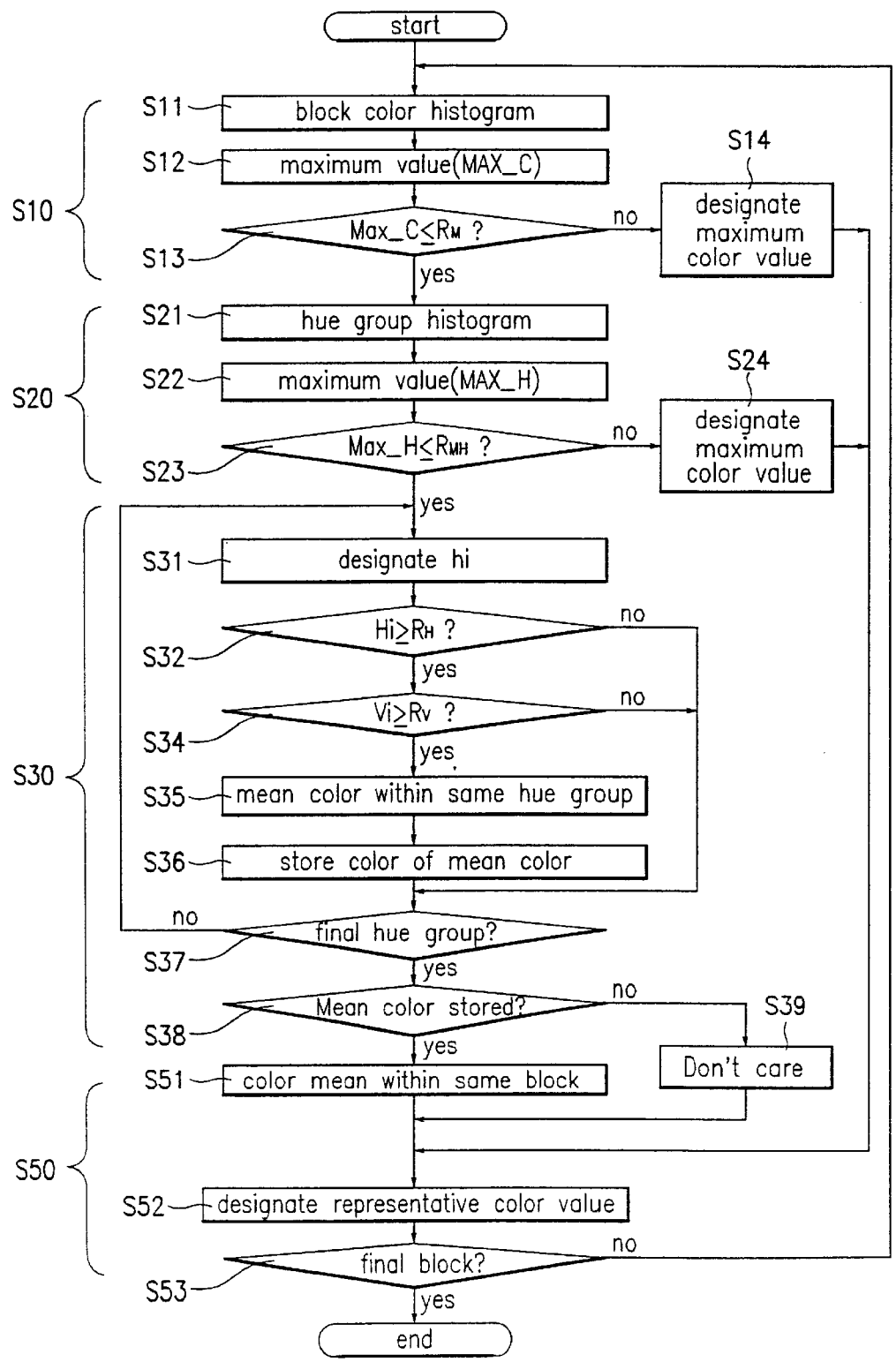

FIGS. 2A–2C are flow charts illustrating a method for designating a local representative color value on a color image. Referring to FIG. 2A, in step S10, a color histogram is built for each block and a maximum value of the histogram is designated as a representative color value of its block.

Figure 1A:
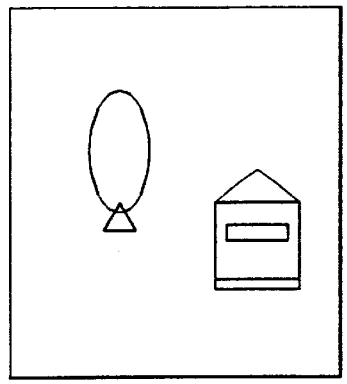
FIGS. 1A to 1E are diagrams providing a method for designating image color values.
Figure 1B:
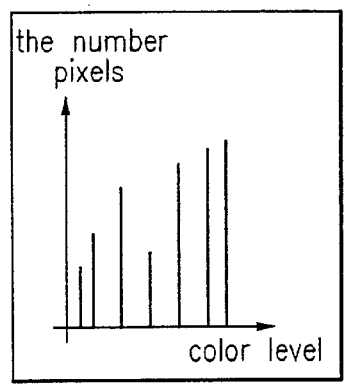
Figure 1C:
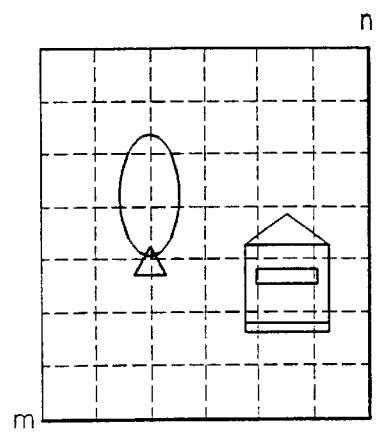
Figures 1D, 1E:
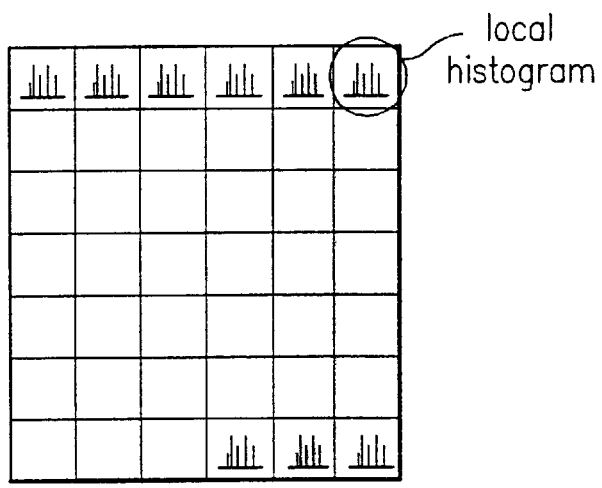

Particularly, the local color histograms for each block of the image as shown in FIG. 1E is built in step S1, and the maximum color value from each local color histograms is selected in step S12. The selected maximum color value Max_C is compared with a predetermined reference value $R_M$ in step S13. If the maximum color value Max_C is greater than the predetermined reference value $R_M$ in step S13, the value is designated as the maximum color value in step S14 and also as the representative color value of the corresponding block in step S52.

If the selected maximum color value Max_C is less than the reference value $R_M$ in step S13, the corresponding block is initially designated as a "don't care" region in step S15. In step S53, a determination is made whether the representative color value designation is completed for the overall image, i.e. whether a representative color value has been designated for the last block of the image, and repeating the steps S11–S14, and S52 until the representative color value is designated for the last block.

To reduce the number of blocks designated as a "don't care" region, step S20 may be added to the method of designating the representatve color values. Referring to FIG. 2B, in step S20, a hue group is further extracted from the color histograms of the blocks, and the maximum value from the extracted values is designated as a representative color value for the corresponding block.

If the selected maximum color value Max_C is less than the reference value $R_M$ in step S13, a determination is made whether a similar color is within an adjacent block. If a local color histogram of a block does not contain a color greater than a given threshold $R_M$, the block may have a color distribution in which one specific color cannot be dominantly perceived. Accordingly, a consideration is made whether there exists a similar color within the block to thereby designate a more effective representative color value visually or sensually.

Particularly, before progressing to step S53, hue group histograms are obtained from the adjacent blocks by mapping similar color groups in step S21, for example, a color group of a red, a color group of a blue, etc. The hue group histograms may be derived from the already existing histograms of the image. In step S22, the maximum color group from the hue group histograms is selected, and the mean value of the maximum color group Max_H is compared with a predetermined reference value $R_{MH}$ in step S23. If the mean hue color group value Max_H is greater than the reference value $R_{MH}$, the value is designated as the maximum color value in step S24 and also as the local representative color value in step S52. If the maximum color group value Max_H is less than the reference value $R_{MH}$, the block is again designated as a "don't care" region in step S25.

As an alternative method to reduce the number of blocks designated as a "don't care" region or to further reduce the number of such blocks, step S30 may be added to the method of designating the representatve color values after either step S20 or S30. Referring to FIG. 2B, in step S30, a distribution rate for the color group is further obtained from the color histogram of each block to designate a representative color value.

If the mean color group value Max_H is less than the reference value $R_{MH}$ in step S23, a local representative hue group value from local hue group histograms is designated for each block in consideration of the color distribution in step S31. In step S32, the local representative hue group value Hi is compared with a predetermined reference value $R_H < R_{MH}$, and if Hi is greater than or equal to the reference value $R_H$, the distribution rate Vi of the hue group value Hi is compared to a reference value Rv in step S34. If the distribution rate Vi is greater than or equal to the reference value Rv, the hue group is determined to be evenly distributed. In step S35, a mean value within the evenly distributed color group Hi is extracted and the mean color corresponding to the mean value is stored in step S36.

In step S37, a determination is made whether the local representative hue group designation is completed for the overall image and steps S31–S36 are repeated until the local representative hue group is designated for the last block. Upon completion, a determination is made in step S38 whether a mean color of the hue group has been stored for each blocks. If a mean color has been stored, that mean color is regarded as mean color for the corresponding block in a step S51, and the value is designated as the representative color value in a step S52. However, if there is no mean color of the hue group corresponding to a block, the block remains designated as a "don't care" region.

Subsequently, the process proceeds to step S53 as discussed above, thereby designating one color value for each block as the representative color value as shown in FIG. 1E. The designated local representative color values shown in FIG. 1E may be one of the maximum color value of a local color histogram greater than a first threshold, the maximum hue group value greater than a second threshold, or the mean color of a representative hue group greater than a third threshold.

Figure 3:
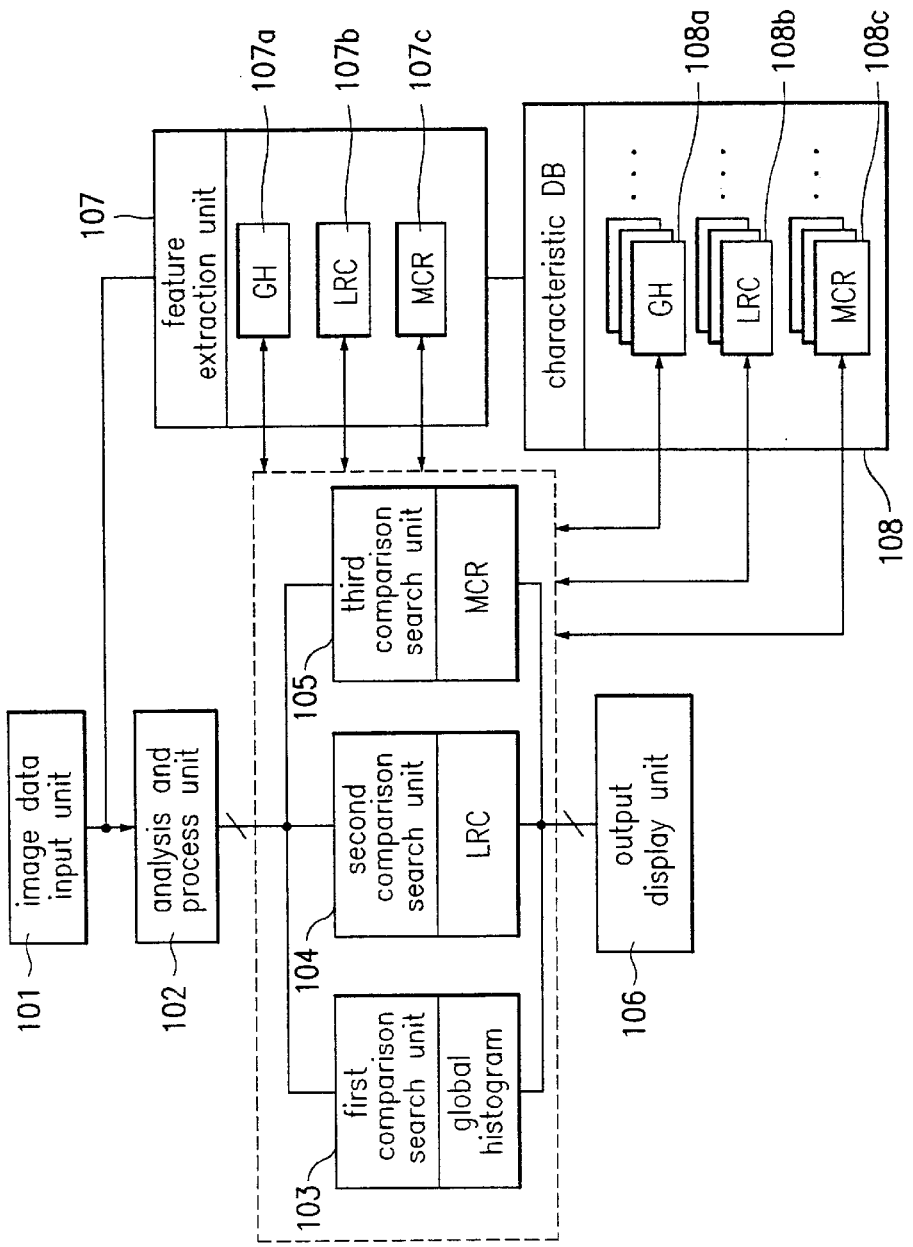
FIG. 3 is a block diagram showing an image searching system according to the present invention.

FIG. 3 is a block diagram of an image searching system according to the present invention. Referring to FIG. 3, the image searching system comprises an image data input unit 101; an analysis and process unit 102 executing an analysis and a processing of images; a plurality of comparison search units 103~105 performing a comparison and search of the images based upon weights of image characteristics; an output display unit 106 outputting and displaying the result of the comparison and search; a feature extraction unit 107 extracting a feature of the images; and a characteristic database 108 storing target images and corresponding characteristic information.

The feature extraction unit 107 includes a global histogram (GH) data module 107a having the color information of an overall image, a local representative color (LRC) data module 107b having the color information of each blocks, and a major color region (MCR) data module 107c having the color information of a region. The characteristic database 108 also includes a global histogram (GH) data module 108a, a local representative color (LRC) data module 108b, and a major color region (MCR) data module 108c, each data modules storing respective characteristic information of the target images.

Figure 4:
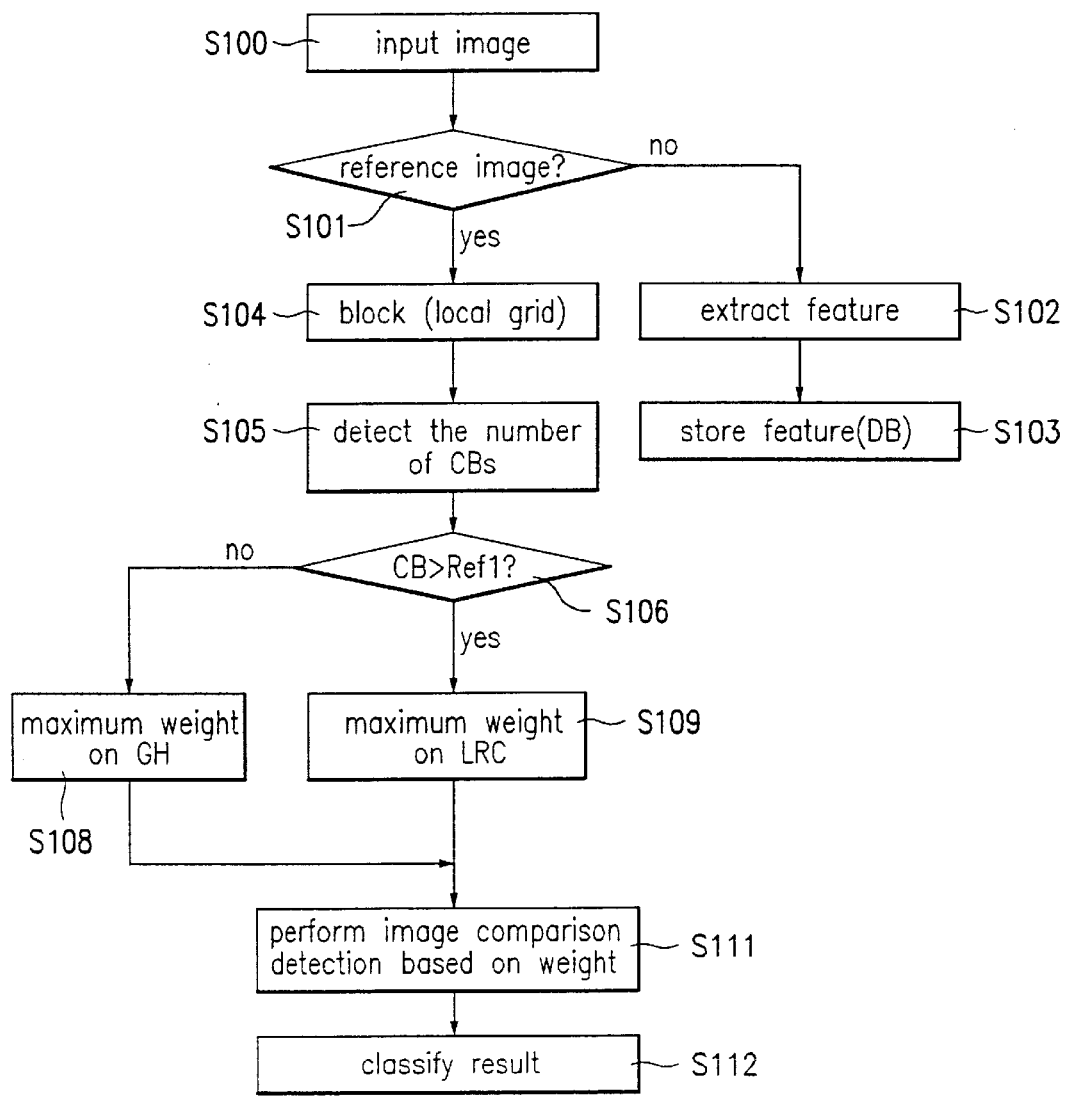
FIG. 4 is a flow chart showing a method for selecting an optimal searching algorithm according to one embodiment of the present invention.
Figure 5:
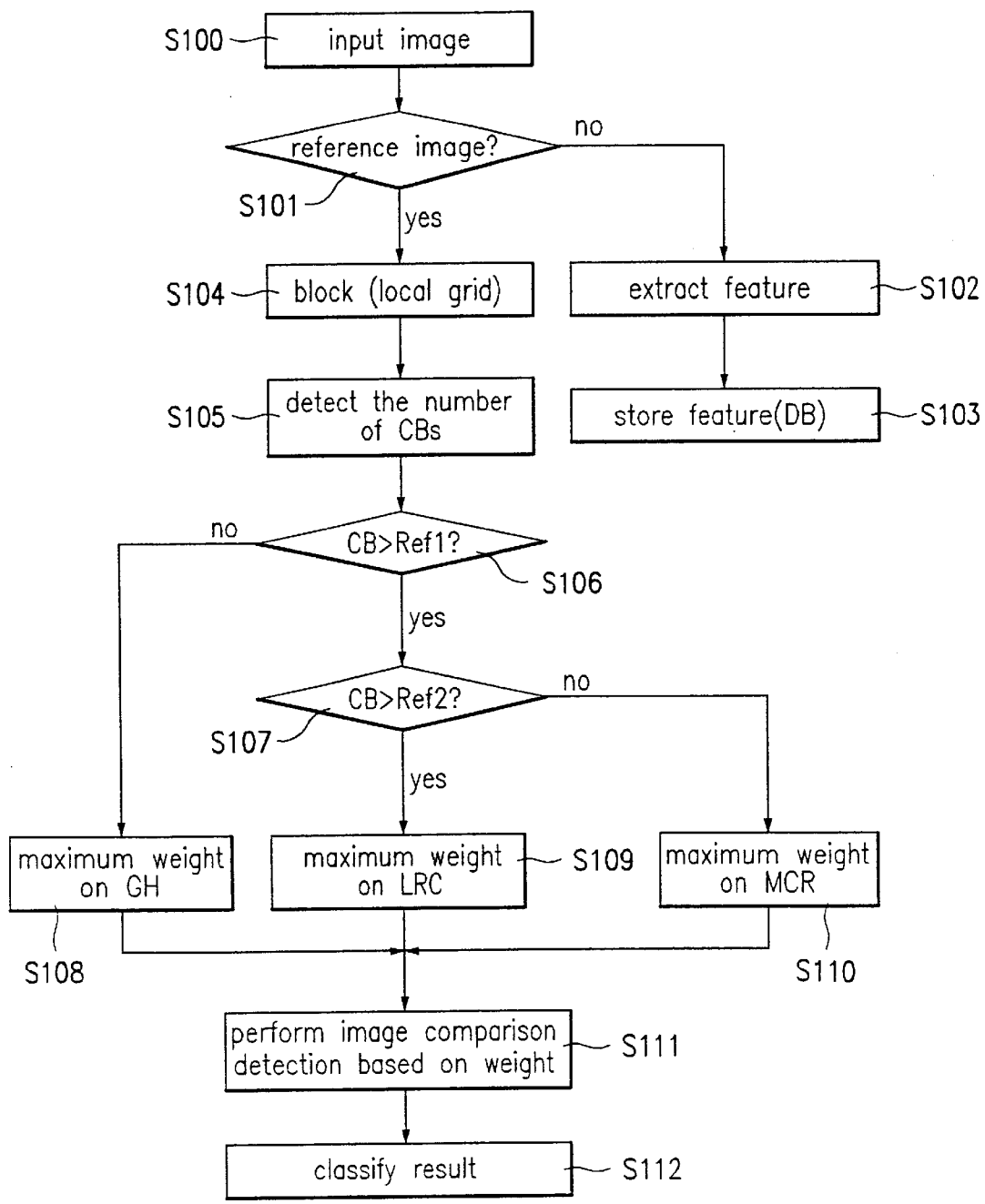
FIG. 5 is a flow chart showing a method for selecting an optimal searching algorithm according to a second embodiment of the present invention.

FIGS. 4 and 5 are flow charts showing a method for an automatic determination of an optimal search algorithm according to the present invention.

FIG. 4 shows a first embodiment of a method for an automatic determination of an optimal search algorithm including the steps of: inputting an image, detetermining whether the image is a reference image, and detecting the number of color blocks CB having color information from the blocks of the reference image (steps S100, S101, S104 and S105); extracting and storing the feature information of image in respective data modules if the input image is not a reference image (steps S102~S103); comparing the number of the color blocks with a predetermined first reference value Ref1 and determining weights for the GH and LRC according to the comparison result (steps S106~S109); and performing a comparison search of the image by the search algorithm based on the determined weight and classifying the search result (steps S111 and S112).

FIG. 5 shows a another embodiment of a method for an automatic determination of an optimal search algorithm including the steps of: inputting an image, determining whether the image is a reference image, and detecting the number of color blocks CB having color information from the blocks of the reference image (steps S100, S101, S104 and S105); extracting and storing the feature information of image in respective data modules if the input reference is not a reference image (steps S102~S103); comparing the number of the color blocks with a plurality of reference values and determining weights for at least two search algorithms according to the comparison result (steps S106~S110); and performing a comparison search of the image by the search algorithm based on the determined weight and classifying the search result (steps S111 and S112).

The operations of the first and second embodiments will be described in reference to FIGS. 3 to 5.

If the image data input to the image data input unit 101 is a reference image, a comparison-search is performed, and but if the image is a target image, the feature extraction unit 107 extracts and stores its feature value in the database 108. The target image is a real image and is the image in which a search is made while the reference image is a standard image used for a comparison and is typically a real image but may also be a virtual image made by a user in a content base image search system.

In the image feature extraction to establish the database, the global histogram data GH, the local representative color information LRC and the major color information MCR are extracted and are stored respectively in the GH, LRC, and MCR of the database 108. The content comparison-search based upon the GH, LRC and MCR is performed by each comparison search unit 103 to 105.

Particularly, the analysis and process unit 102 analyzes the image data, and first to third comparison search units 103~105 execute a search algorithm for the analyzed image information. Namely, the comparison search units 103~105 each execute search algorithms based upon GH, LRC and MCR information from the feature extraction unit 107 and the database 108. In the embodiments of the present invention illustrated, the number of search algorithms has been limited to two or three, and the comparison searches are based upon GH, LRC, and MCR. However, the present invention is not limited to such embodiments.

After the initial analysis and processing of the image information, the image divided into blocks by an image grid and the number of the color blocks CB is detected. For example, an image may be divided into grids of 'width× height=8×8=64'. Histograms, namely local histograms, for each respective grids is built. A color index of a representative color in the local histogram is designated as the local representative color LRC for a corresponding grid. However, not every grid would have a LRC and would be designated as a "don't care" region, as discussed above.

The number of color blocks CBs with LRCs, i.e. not designated as "don't care" region, are detected and the detected number of CB indicates a characteristic of the input image. Subsequently, the detected number of CBs is utilized in selecting an optimal search algorithm.

If the characteristic of the image is generally distinct in each grid, the detected number of CBs would be high. Because of the distinct grid characteristics, a search based upon the LRC would be most effective. Thus, the LRC algorithm is given maximum weight if the detected number of CBs is high.

If the characteristic of the image is distributed throughout the entire image, the number of CBs detected would be fairly low. Because the characteristic of the image is distributed, a search based upon the GH would be most effective. Thus, the GH alghorithm is given the maximum weight if the detected number of CBs is low.

However, if the characteristic of the image are clustered and appears in regions of the image, the detected number of CBs would neither be high or low, but somewhere in between depending upon the image. Thus, it is difficult to decide whether a search based upon the LRC or GH would be most effective. Accordingly, the MCR algorithm is given the maximum weight if the detected number of CBs is neither high or low.

Particularly, the detected number of CBs is compared to predetermined reference values Ref1, Ref2 where Ref1<Ref2. If the number of CBs is less than or equal to the first reference value Ref1, GH is assigned the maximum weight. If the number of CBs is greater than Ref1, and the number of CBs is more than the second reference value Ref2, the LRC is assigned the maximum weight. If the number of CBs is greater than Ref1, and the number of CBs is less than or equal to Ref2, i.e. the number of CBs is between Ref1 and Ref2, MCR is assigned the maximum weight.

As shown in FIGS. 4 and 5, the weights assigned to the image searching algorithms may a nonlinear type or linear type according to the CBs number. Accordingly, different weights are assigned to the three comparison search algorithms, and the image searching is performed based upon the weighted search algorithms. The result of the comparison is displayed through the output display unit 106, thereby completing the image search.

The present invention may be easily implemented in any image searching system. Also, the standard for searching the image characteristic to assign the appropriate weights need not be the detection of the number of CBs. Any other method may be used as the standard for searching the image characteristic.

In addition, the method for designating the local representative color value allows a consideration of a color distribution of each block without having to unnecessary information. Rather than storing the local a histogram, one color per one block is designated as the representative color value and stored.

Furthermore, the present invention also selects the most appropriate search algorithm automatically enabling an automatic control of the weights assigned to the search algorithms. As a result, a convenient operation for the image searching system is available to even general users and non-effectiveness of the search system caused by an individual deviation can be prevented.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for designating a local representative color (LRC) values of a color image, comprising:
   (a) dividing a color image into a plurality of blocks;
   (b) building a color histogram for each block and designating the maximum color value of the color histogram as a LRC value of a corresponding block if the maximum color value meets a first condition; and
   (c) repeating step (b) until the last block of the image is processed, wherein if the maximum color value of a block does not meet the first condition, the method further comprises,
      building hue group histograms from adjacent blocks of the block,
      selecting a maximum color group from the hue group histograms and determining a representative value of the maximum color group, and
      designating the representative value of the maximum color group as the LRC value of the block if the representative value of the maximum color group meets a second condition.

2. The method of claim 1, wherein step (b) further comprises:
   designating the maximum color value as a LRC value if the maximum color value is greater than a first reference value; otherwise designating the block corresponding to the maximum color value as a "don't care" region.

3. The method of claim 1, wherein the representative value is a mean value of the maximum color group, and wherein the designating the LRC value comprises:
   designating the mean value of the maximum color group as the LRC value if the mean value of the maximum color group is greater than a second reference value; otherwise designating the block as a "don't care" region.

4. The method of claim 3, wherein if the mean value of the maximum color group of the block does not meet the second condition, the method further comprises:

building local hue group histograms and determining a local representative hue group value from the local hue group histograms; and designating the mean value of the local representative hue group value as the LRC value if the local representative hue group value meets a third condition and if the distribution of the local representative hue group value meets a fourth condition.

5. The method of claim 4, further comprising:

designating the mean value of the local representative hue group value as the LRC value if the local representative hue group value is greater than or equal to a third reference value and if said distribution is greater than or equal to a fourth reference value; otherwise designating the block as a the "don't care" region.

6. The method of claim 5, wherein the third reference value is less than the second reference value.

7. The method of claim 1, wherein if the maximum color value of the block does not meet the first condition, the method further comprises:

building local hue group histograms and determining a local representative hue group value from the local hue group histograms; and designating a representative value of the local representative hue group value as a the LRC value if the local representative hue group value meets a third condition and if the distribution of the local representative hue group value meets a fourth condition.

8. The method of claim 7, further comprising:

designating the representative value of the local representative hue group value as the LRC value if the local representative hue group value is greater than or equal to a third reference value and if said distribution is greater than or equal to a fourth reference value; otherwise designating the block as a "don't care" region.

9. The method of claim 1, wherein the plurality of blocks comprise equal blocks, and wherein the representative value is an average value of the maximum color group.

10. A method for designating a local representative color (LRC) values of a color image, comprising:

(a) dividing a color image into a plurality of blocks;

(b) building a color histogram for each block and designating the maximum color value of the color histogram as a LRC value of a corresponding block if the maximum color value meets a first condition; and (c) repeating step (b) until the last block of the image is processed, wherein if the maximum color value of a block does not meet the first condition, the method further comprises, building local hue group histograms and determining a local representative hue group value from the local hue group histograms, and designating a representative value of the local representative hue group value as the LRC value if the local representative hue group value meets a second condition and if the distribution of the local representative hue group value meets a third condition.

11. A method of claim 10, wherein the representative value is a mean value of the local representative hue group value, further comprising:

designating the mean value of the local representative hue group value as the LRC value if the local representative hue group value is greater than or equal to a second reference value and if said distribution is greater than or equal to a third reference value; otherwise designating the block as a "don't care" region.

12. The method of claim 10, wherein the plurality of blocks comprise equal blocks.

13. A method for designating a local representative color (LRC) values of a color image, comprising:

dividing a color image into a plurality of blocks;

building a color histogram for each block;

building hue group histograms from adjacent blocks of a block;

selecting a maximum color group from the hue group histograms and determining a representative value of the maximum color group;

designating the representative value of the maximum color group as a LRC value of the block if the representative value of the maximum color group meets a first condition, wherein if the representative value does not meet the first condition, the designating the LRC values of the color image comprises, building local hue group histograms and determining a local representative hue group value from the local hue group histograms; and designating a representative value of the local representative hue group value as the LRC value if the local representative hue group value meets a second condition and if the distribution of the local representative hue group value meets a third condition.

14. The method of claim 13, further comprising:

designating a mean value of the local representative hue group value as the LRC value if the local representative hue group value is greater than or equal to a second reference value and if said distribution is greater than or equal to a third referee value; otherwise designating the block as a "don't care" region.

15. The method of claim 14, wherein the plurality of blocks comprise equal blocks.

16. A method for designating a local representative color (LRC) values of a color image, comprising:

dividing a color image into a plurality of blocks;

determining a color histogram for each block; and designating a local representative color (LRC) for each of the plurality of blocks, wherein the designating the LRC comprises, determining a first criteria of the color histogram as the LRC of a corresponding block when the first criteria meets a first condition;

determining a second criteria as the LRC of the corresponding block when the first criteria does not meet the first condition and the second criteria meets a second condition, wherein the determining the second criteria comprises, building first group histograms from related blocks of the corresponding block, selecting the second criteria from the first group histograms, and determining the second criteria as the LRC of the corresponding block when the second criteria meets the second condition;

determining a third criteria as the LRC of the corresponding block when the second criteria does not meet the second condition and the third criteria meets a third condition, wherein the determining the third criteria comprises, building second group histograms, selecting the third criteria from the second group histograms, and determining the third criteria as the LRC of the corresponding block when the third criteria meets the third condition; and designating the corresponding block as a "don't care" region when the first through third criteria do not meet the first through third conditions, respectively.

17. The method of claim 16, wherein the first criteria is a maximum color value of the color histogram.

18. The method of claim 16, wherein the second criteria is a mean value of a maximum color group from the first group histograms, and wherein the first group histograms are local hue group histograms.

19. The method of claim 16, wherein the third criteria is a mean value of a local representative hue group value and a distribution of the local representative hue group value meets a fourth condition, and wherein the second group histograms are local hue group histograms.

20. The method of claim 16, wherein the first criteria is a color value of the color histogram that satisfies a first threshold, wherein the second criteria is a representative value of a maximum color group from hue group histograms, wherein the third criteria is a representative value of a local representative hue group value from the local hue group histograms.

* * * * *